United States Patent
Hummelt et al.

(10) Patent No.: US 9,278,596 B2
(45) Date of Patent: Mar. 8, 2016

(54) TRANSVERSE LEAF SPRING ASSEMBLY FOR A MOTOR VEHICLE

(71) Applicant: Benteler Automobiltechnik GmbH, Paderborn (DE)

(72) Inventors: Jürgen Hummelt, Paderborn (DE); Aloys Schröder, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/260,971

(22) Filed: Apr. 24, 2014

(65) Prior Publication Data

US 2014/0327196 A1    Nov. 6, 2014

(30) Foreign Application Priority Data

May 6, 2013   (DE) .......................... 10 2013 104 618

(51) Int. Cl.
*B60G 11/10*   (2006.01)
*B60G 11/08*   (2006.01)

(52) U.S. Cl.
CPC .............. *B60G 11/08* (2013.01); *B60G 11/10* (2013.01); *B60G 2204/41* (2013.01); *B60G 2204/41043* (2013.01); *B60G 2206/011* (2013.01)

(58) Field of Classification Search
USPC ............ 267/36.1, 40, 42, 44, 47, 48, 52, 269; 280/124.125, 124.134, 124.171, 280/124.175, 124.177
See application file for complete search history.

(56) References Cited

U.S. PATENT DOCUMENTS

| | | | |
|---|---|---|---|
| 3,913,937 A | 10/1975 | Longworth et al. | |
| 4,768,807 A | 9/1988 | McGibbon et al. | |
| 5,251,930 A | 10/1993 | Kusaka et al. | |
| 6,009,986 A * | 1/2000 | Bansemir et al. | 188/380 |
| 8,360,454 B2 * | 1/2013 | Fruhmann et al. | 280/124.175 |
| 8,454,042 B2 | 6/2013 | Hochapfel et al. | |
| 2004/0004336 A1 | 1/2004 | Zandbergen et al. | |
| 2008/0303237 A1* | 12/2008 | Preijert | 280/124.125 |
| 2012/0098229 A1* | 4/2012 | Hochapfel et al. | 280/124.134 |
| 2012/0146308 A1 | 6/2012 | Fruhmann et al. | |

FOREIGN PATENT DOCUMENTS

| | | |
|---|---|---|
| DE | 10 2008 049 761 A1 | 4/2010 |
| DE | 102009028574 | 2/2011 |
| DE | 10 2009 028 899 A1 | 3/2011 |
| DE | 102009028896 | 3/2011 |

(Continued)

OTHER PUBLICATIONS

English language Chinese Search Report issued in counterpart Chinese patent application No. 2014101787902 on Oct. 30, 2015.

*Primary Examiner* — Christopher Schwartz
(74) *Attorney, Agent, or Firm* — Henry M. Feiereisen LLC

(57) ABSTRACT

A transverse leaf spring assembly for a motor vehicle includes a transverse leaf spring which is arranged transversely to the motor vehicle. A bearing unit connects the transverse leaf spring to a body of the motor vehicle and has a holder and elastic dampers. Accommodated in the holder is an adapter which has an interior space suited to a cross sectional geometry of the transverse leaf spring, with the transverse leaf spring being received in the adapter between the elastic dampers.

17 Claims, 3 Drawing Sheets

(56) References Cited

FOREIGN PATENT DOCUMENTS

| DE | 102010060093 | 4/2012 |
| DE | 20 2013 10390 | 9/2013 |
| EP | 1 378 382 A1 | 1/2004 |
| EP | 1 645 445 A1 | 4/2006 |

* cited by examiner

TRANSVERSE LEAF SPRING ASSEMBLY FOR A MOTOR VEHICLE

CROSS-REFERENCES TO RELATED APPLICATIONS

This application claims the priority of German Patent Application, Serial No. 10 2013 104 618.5, filed May 6, 2013, pursuant to 35 U.S.C. 119(a)-(d), the disclosure(s) of which is/are incorporated herein by reference in its entirety as if fully set forth herein.

BACKGROUND OF THE INVENTION

The present invention relates to a transverse leaf spring assembly for a motor vehicle.

The following discussion of related art is provided to assist the reader in understanding the advantages of the invention, and is not to be construed as an admission that this related art is prior art to this invention.

Springs in the form of leaf spring are used for control and suspension of vehicle wheels. A leaf spring is normally made of resilient material such as metal and/or plastic and/or composites and has an elongate, typically beam-shaped configuration with a midsection and at least two ends.

When referring to a transverse leaf spring, a leaf spring is involved which is arranged horizontally transversely to a longitudinal axis of the motor vehicle. In midsection, the transverse leaf spring is typically connected or mounted to the vehicle body via two bearing units. In this way, the two ends of the transverse leaf spring are able to execute a substantially vertical spring motion. The transverse leaf spring interacts with wheel carriers or with a further component of the wheel suspension via terminal bearings on the ends of the transverse leaf spring. The transverse leaf spring assumes wheel-controlling functions, steering functions as well as damping and load-bearing tasks and may substitute helical springs and/or stabilizers necessary in the conventional wheel suspension.

The use of wheel controlling transverse leaf springs thus enables the elimination of stabilizers, required heretofore, including their bearings, or of swivel supports, transverse control arms and conventional helical springs. As a result, the number of components is reduced and assembly is simplified. Still, depending on stiffness requirements, determined by vehicle weight, vehicle comfort, vehicle dynamics and/or chassis tuning etc., different transverse leaf springs are required with respective stiffness rates that have diverse cross sectional geometries. As a result, the cross section of transverse leaf springs used within a vehicle line varies, while the installation situation of the transverse leaf spring in the chassis still remains the same. Thus, each type of transverse leaf spring requires modifications to compensate for the differences in geometry. This is cumbersome and disadvantageous.

It would therefore be desirable and advantageous to provide an improved transverse leaf spring assembly to obviate prior art shortcomings and to enable an efficient installation of different transverse leaf springs with diverse cross sectional geometry, even though the installation space in a vehicle line or family is the same.

SUMMARY OF THE INVENTION

According to one aspect of the present invention, a transverse leaf spring assembly for a motor vehicle includes a transverse leaf spring arranged transversely to the motor vehicle, a bearing unit configured to connect the transverse leaf spring to a body of the motor vehicle, the bearing unit including a holder and elastic dampers, and an adapter accommodated in the holder and having an interior space suited to a cross sectional geometry of the transverse leaf spring, the transverse leaf spring being received in the adapter between the elastic dampers.

According to another aspect of the present invention, a kit for a motor vehicle includes a plurality of transverse leaf springs, each configured for installation transversely to the motor vehicle via a bearing unit upon a vehicle body, each transverse leaf spring having at least one length portion, with the length portions of the transverse leaf springs having different cross sectional geometries, and a plurality of adapters configured to conform with the transverse leaf spring in one-to-one correspondence for selective installation in a holder of the bearing unit between elastic dampers.

In accordance with the present invention, various transverse leaf springs or types of transverse leaf springs with different cross sectional geometry can be integrated in a fixed and unchangeable installation space of a motor vehicle by using an adapter. Different types of transverse leaf springs can be mounted without the need to modify the outer attachment points of the bearing unit, holders of the bearing unit, or other bearing components.

In accordance with the present invention, the installation space for the transverse leaf spring in the bearing unit is configured to suit a maximum cross sectional geometry of the transverse leaf spring or to suit the transverse leaf spring having the maximum cross sectional geometry. Depending on the transverse leaf spring being used and selected as a function of vehicle-specific requirements such as vehicle weight, vehicle comfort, travel dynamics and chassis tuning, an adapter is used which matches the cross sectional geometry of the selected transverse leaf spring. The transverse leaf spring is accommodated in the bearing unit of the adapter together with the elastic dampers.

A transverse leaf spring assembly according to the present invention may involve both a wheel-controlling transverse leaf spring assembly and a transverse leaf spring assembly not intended for wheel control. The transverse leaf spring may assume wheel-controlling functions. In the event, the transverse leaf spring is not intended for wheel control, it can be connected at the end with the control arms. In this way, the need for stabilizers is eliminated.

According to another advantageous feature of the present invention, all adapters can have a same outer configuration and define each an interior space configured to match the cross sectional geometry of the pertaining one of the transverse leaf springs and receiving the pertaining transverse leaf spring with a length portion in the bearing zone.

According to another advantageous feature of the present invention, the adapter can include two adapter parts connectable to one another. Advantageously, the two adapter parts involve an upper adapter part and a lower adapter part. The two adapter parts are connectable to one another via force-locking and/or form-fitting coupling elements. Examples of such coupling elements include clips, spring elements or latching elements. Advantageously, the adapter can have on the outside connectors configured to couple the adapter to the dampers.

The outer contour of both adapter parts precisely fits in the inner contour of the bearing unit or the holder of the bearing unit. In this way, the transverse leaf spring can be fitted together with the adapter precisely into the prepared bearing device and mounted into the bearing unit.

As described above, both adapter parts are connected to one another in a formfitting manner, for example by clips, so that pre-assembly of the adapter upon the transverse leaf spring is simplified. After pre-assembly, the transverse leaf spring is installed together with the adapter in a bearing unit. Normally, the bearing device for the transverse leaf spring includes two bearing units within the transverse leaf spring assembly.

According to another advantageous feature of the present invention, the adapter may be made of plastic, e.g. polyamide. The adapter or the adapter parts may also be made of fiber-reinforced plastic. Material and elasticity of the material are selected to ensure a resiliently clamping connection of both adapter parts with one another. The elasticity in particular has to satisfy a clip connection. The elasticity of the material of the adapter is selected in such a way that the adapter does not adversely affect performance of the transverse leaf spring and the bearing device and permits a translational movement of the transverse leaf spring in a direction transversely to the vehicle. The adapter only has to satisfy the function to compensate the cross section of a transverse leaf spring within the bearing unit.

In accordance with the present invention, there is no need for the presence of any additional connection element between the adapter and the transverse leaf spring or between the adapter and the holder which normally is configured in the form of a bracket. The holder of the bearing unit is normally securely fixed to the vehicle axle support. For securement in the vertical vehicle axis (z-axis), the adapter is pushed into the holder between the dampers. For securement in the transverse vehicle axis (y-axis), the connectors provide the coupling of the adapter with the dampers.

According to another advantageous feature of the present invention, the connectors can be configured to interact with abutments on the dampers for coupling the adapter to the dampers.

According to another advantageous feature of the present invention, support plates can be integrated in the dampers, with the connectors interacting with free ends of the support plates for coupling purposes. The support plates realize the connection between the dampers and the adapter. At the same time, the support plates provide force-transmitting and shock-absorbing functions in the dampers. Advantageously, the support plates are made of plastic, metal, or composite and can be embedded in the dampers that can be made of elastomeric material, for example rubber.

According to another advantageous feature of the present invention, the adapter can be joined by a material joint with the dampers. Advantageously, the adapter or adapter parts can be vulcanized directly onto the dampers. In this case, the adapter parts are connected with one another together with the dampers, vulcanized thereon, via coupling elements, such as clip or latch elements. The single-piece construction of the damper and adapter further simplifies components and pre-assembly.

According to another advantageous feature of the present invention, the adapter has sidewall regions which can be configured to conform geometrically to inner wall regions of the holder. Likewise, it is advantageous when the adapter has receiving surfaces which can be configured to conform geometrically to contact surfaces of the dampers. As a result, design of the components is especially beneficial, the attachment of the transverse leaf spring in the bearing unit is positively affected, and spring and stabilizing functions of the transverse leaf spring, assembly are improved.

According to another advantageous feature of the present invention, the transverse leaf spring can be made of glass-fiber reinforced plastic.

The transverse leaf spring may assume in addition to suspension and stabilizing functions also wheel control and thus assume essential tasks relating to tracking stability and travel safety of a motor vehicle. As described above, the transverse leaf spring as part of the transverse leaf spring assembly does not have to assume wheel-controlling functions. In this case, the transverse leaf spring is not connected directly with the wheel carriers or other wheel suspension components so that there is no need for the transverse leaf spring to absorb a transverse force from the wheels. Support in transverse direction of the vehicle does not have to be that stiff so that the ratio of roll spring force to lift spring rate can be adjusted.

A transverse leaf spring assembly according to the present invention provides flexibility for a specific chassis construction by the automobile manufacturer.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
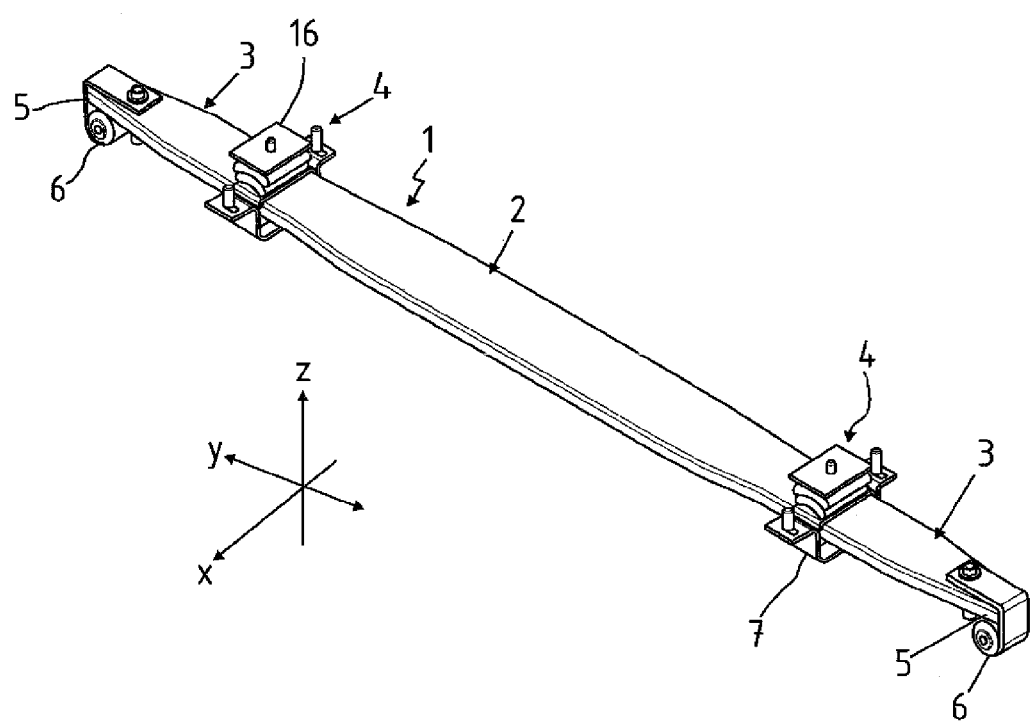
FIG. 1 is a top and side perspective view of a transverse leaf spring assembly according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a top and side perspective view of a transverse leaf spring assembly according to the present invention for a motor vehicle, including a transverse leaf generally designated by reference numeral 1 and arranged in transverse relationship to the motor vehicle. The transverse leaf spring 1 is made of a glass-fiber reinforced plastic and has a midsection 2 and two opposite end zones 3. The transverse leaf spring 1 is connected for example to the body or to a subframe of the motor vehicle via two bearings, generally designated by reference numeral 4 and arranged in symmetry in relation to the longitudinal axis of the motor vehicle (x-axis). Bearings 6 are provided at the free ends 5 of the end zones 3 for attachment of the transverse leaf spring 1 to a wheel carrier or to a further component of the wheel suspension.

Figure 2:
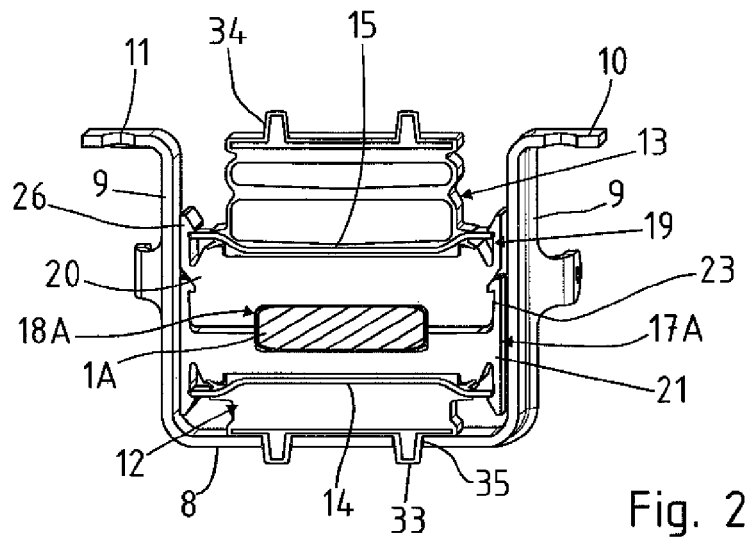
FIG. 2 is a vertical cross section of a first embodiment of a bearing unit of the transverse leaf spring assembly for supporting a first variant of a transverse leaf spring of the transverse leaf spring assembly.
Figure 3:
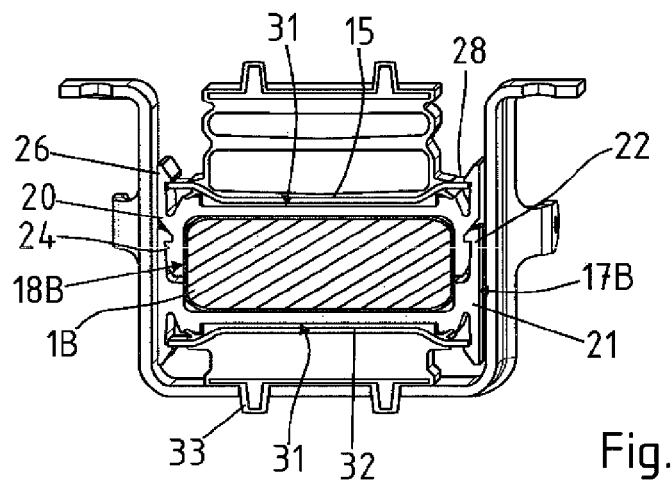
FIG. 3 is a vertical cross section of the bearing unit of the transverse leaf spring assembly for supporting a second variant of a transverse leaf spring of the transverse leaf spring assembly.
Figure 4:
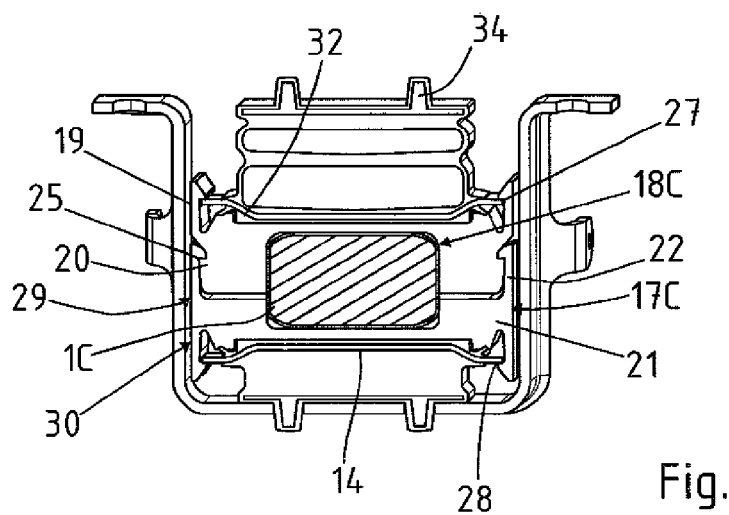
FIG. 4 is a vertical cross section of the bearing unit of the transverse leaf spring assembly for supporting a third variant of a transverse leaf spring of the transverse leaf spring assembly.

Each bearing unit 4 essentially includes a holder 7 in the form of an U-shaped bracket, as shown, for example in FIGS. 2 to 4. The holder 7 or bracket has a bottom 8 with two side legs 9. Formed at the ends of the side legs 9 are outwardly bent flanges 10 which are provided with bores 11 for receiving, for example, bolts or other fasteners via which the holder 7 can be secured to the vehicle body. The holder 7 embraces the transverse leaf spring 1 from its lower broadside and the two narrow sides.

The transverse leaf spring 1 is arranged in the holder 7 between a first lower damper 12 and a second upper damper 13. The dampers 12, 13 are preferably configured in the form of rubber-metal parts and are made of rubber with integrated support plates 14, 15 of metal. Atop the upper damper 13 is a clamp 16, illustrated in FIG. 1.

The installation situation of a transverse leaf spring 1 in the motor vehicle or chassis is the same in a vehicle family. Depending on the design of the vehicles, the use of stiffer or softer transverse leaf springs 1 is, however, required. Thus, a vehicle family requires transverse leaf springs 1 of different cross section or transverse leaf springs 1 of different cross section have to be installed depending on design and weight.

FIGS. 2, 3 and 4 show various variants of transverse leaf spring 1A, 1B, 1C. The transverse leaf spring 1A, 1B, 1C have a different cross section in the length portion that is received in the bearing unit 4. The cross section or cross sectional geometry of the transverse leaf springs 1A, 1B, 1C is shown in FIGS. 2-4 by respective hatching. In order to realize a correct wheel contact height and desired lift and roll spring rates, adapter 17A, 17B, 17C are used. The transverse leaf spring 1A, 1B, 1C is received in the holder 7 through intervention of a suitable one of the adapters 17A, 17B, 17C. In the exemplary embodiment illustrated here, a kit is provided with three transverse leaf spring 1A, 1B, 1C and three adapters 17A, 17B, 17C. The adapters 17A, 17B, 17C have each an interior space 18A, 18B, 18C which conforms to the cross sectional geometry of the transverse leaf springs 1A, 1B, 1C, respectively. The transverse leaf spring 1A, 1B, 1C is received in the interior space 18A, 18B, 18C in a form-fitting manner. The adapters 17A, 17B, 17C have connectors 19 for coupling with the dampers 12, 13.

As shown in FIGS. 2 to 4, the adapters 17A, 17B, 17C are each comprised of two adapter parts, i.e. an upper adapter part 20 and a lower adapter part 21, which are connectable to one another. The upper adapter part 20 and the lower adapter part 21 are connected to one another in a force-locking and form-fitting manner. For that purpose, both the upper adapter part 20 and the lower adapter part 21 are provided with coupling elements in the form of clip or latch elements 22, 23 with undercuts 24 and abutment surfaces 25 which resiliently snap into engagement, when the adapter parts 20, 21 are coupled with one another.

The connectors 19 of the adapter 17A, 17B, 17C at the upper adapter part 20 and at the lower adapter part 21, via which the connection to the dampers 12, 13 is realized, are also configured as clip or latching elements 26. These latching elements 26 have a tongue or lug-shaped configuration and project upwards and downwards in the direction of the dampers 12, 13, respectively. The latching elements 26 have undercuts 27 which interact with abutments 28 on the dampers 12, 13. The abutments 28 are formed by the free ends 29 of the support plates 14, 15 which project beyond the dampers 12, 13 and interact with the connectors 19 in a coupling manner.

A selected one of the transverse leaf springs 1A, 1B, 1C is placed in the holder 7 with a matching one of the adapters 17A, 17B, 17C. The adapters 17A, 17B, 17C have sidewall regions 30 which geometrically complement the inner wall regions 29 of the holder 7. The sidewall regions 30 bear hereby upon the inner wall regions 29 of the side legs 9 of the holder 7. In addition, bearing surfaces 31 are provided on the upper adapter part 20 and on the lower adapter part 21. The bearing surfaces 31 geometrically complement contact surfaces 32 of the dampers 12, 13. As a result, a form-fitting, stable and reliable force-transmitting connection is realized between the dampers 12, 13 and the adapter 17A, 17B, 17C or adapter parts 20, 21.

The dampers 12, 13 are further provided with vertically projecting pins 33, 34, with the pins 33 of the lower damper 12 configured for engagement in openings 35 in the bottom 8 of the holder 7. The pins 34 of the upper adapter part 20 extend through openings of the upper clamp 16, not shown in FIGS. 2-4.

Figure 5:
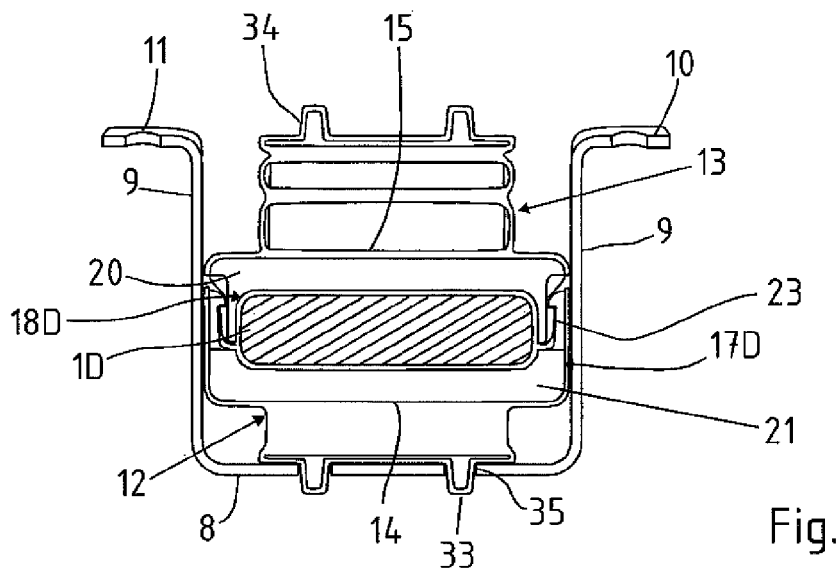
FIG. 5 is a vertical cross section of a second embodiment of a bearing unit of the transverse leaf spring assembly for supporting a fourth variant of a transverse leaf spring of the transverse leaf spring assembly.
Figure 6:
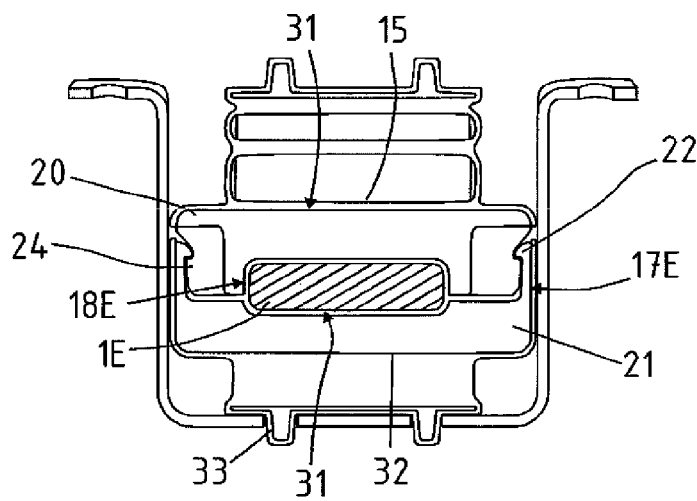
FIG. 6 is a vertical cross section of the second embodiment of the bearing unit of the transverse leaf spring assembly for supporting a fifth variant of a transverse leaf spring of the transverse leaf spring assembly.
Figure 7:
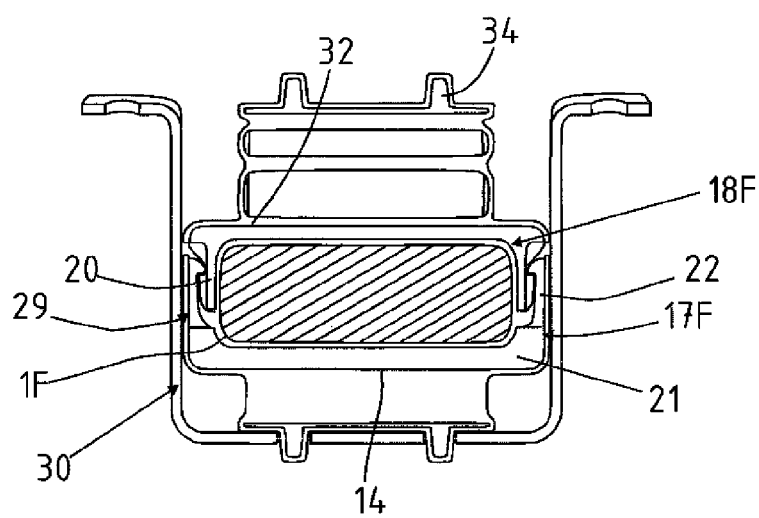
FIG. 7 is a vertical cross section of the second embodiment of the bearing unit of the transverse leaf spring assembly for supporting a sixth variant of a transverse leaf spring of the transverse leaf spring assembly.

FIGS. 5, 6, 7 show a vertical cross section of a second embodiment of a bearing unit 4 of the transverse leaf spring assembly for receiving a selected one of further variants of transverse leaf springs 1D, 1E, 1F via holder 7. The transverse leaf springs 1D, 1E, 1F have length portions which are respectively received in the bearing unit 4 and have different cross section and which are shown by hatching. The basic functions correspond to the afore-described bearing unit so that parts shown in FIGS. 5-7 and corresponding with those in FIGS. 2-4 are denoted by identical reference numerals and not explained again.

The transverse leaf springs 1D, 1E, 1F are respectively received in the holder 7 though intervention of an appropriate one of the adapters 17D, 17E, 17F. An essential difference to the afore-described embodiments resides in that the upper adapter part 20 and the lower adapter part 21 are joined by a material joint with the dampers 12, 13. The upper adapter part 20 is vulcanized onto the bottom side of the upper damper 13. The lower adapter part 21 is vulcanized onto the topside of the lower damper 12. In this way, the upper adapter part 20 and the upper damper 13 form a unitary structure, and the lower adapter part 21 and the lower damper 12 form a unitary structure. The connection between the upper adapter part 20 and the lower adapter part 21 with incorporated one of the transverse leaf springs 1D, 1E, 1F is realized via formfittingly interconnectable coupling elements in the form of clip or latching elements 22, 23.

With a transverse leaf spring assembly according to the invention, diverse transverse leaf springs 1A-1C, 1D-1F of different cross sectional geometry can be effectively fitted in a bearing unit, while the installation space in a vehicle line or family is the same and while ensuring a correct wheel contact height and demanded lift and roll spring rate. The kit includes a set of transverse leaf springs 1A-1C, 1D-1F and a set of adapters 17A-17C, 17D-17F. The adapters 17A-17F are configured to match the cross sectional geometry of the transverse leaf springs 1A-1F in the length portion of the bearing connection. The adapters 17A-17F can be mounted in a simple manner by a spring clamping connection of the upper adapter part 20 and the lower adapter part 21 via the coupling elements 22, 23. The connection between the adapters 17A-

17C and the dampers 12, 13 is realized via the connectors 19. The adapters 17D-17F are connected by a material joint with the dampers 12, 13 through vulcanization. Pre-assembled jointly with the dampers 12, 13, the unit of transverse leaf spring 1A-1F and adapter 17A-17F is placed into the holder 7 and installed in the motor vehicle.

All adapters 17A-17F have a same outer configuration, with the interior space 18A-18C, 18D-18F of the adapters 17A-17F complementing the cross sectional geometry of the transverse leaf springs 1A-1F in one-to-one correspondence.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A transverse leaf spring assembly for a motor vehicle, comprising:
   a transverse leaf spring arranged transversely to the motor vehicle;
   a bearing unit configured to connect the transverse leaf spring to a body of the motor vehicle, said bearing unit including a holder and elastic dampers; and
   an adapter accommodated in the holder and having an interior space suited to a cross sectional geometry of the transverse leaf spring, said transverse leaf spring being received in the adapter between the elastic dampers,
   wherein the adapter includes an upper adapter part and a lower adapted part which are directly connectable with one another and confine therebetween the transverse leaf spring in contact with the latter.

2. The transverse leaf spring assembly of claim 1, wherein the adapter includes connectors configured to couple the adapter to the dampers and to interact with abutments of the dampers for coupling the adapter to the dampers.

3. The transverse leaf spring assembly of claim 2, further comprising support plates integrated in the dampers, said connectors configured for coupling with free ends of the support plates.

4. The transverse leaf spring assembly of claim 3, wherein the support plates are made of plastic, metal, or composite.

5. The transverse leaf spring assembly of claim 2, wherein the dampers include an upper elastic damper and a lower elastic damper, and wherein the connectors are configured to interact with abutments on the dampers for coupling the adapter to the dampers and include an upper connector provided on the upper adapter part and interacting with the upper damper and a lower connector provided on the lower adapter part and interacting with the lower damper.

6. The transverse leaf spring assembly of claim 1, wherein the two adapter parts are connectable to one another via force-locking and/or form-fitting coupling elements integrally provided in them.

7. The transverse leaf spring assembly of claim 1, wherein the adapter is joined by a material joint with the dampers.

8. The transverse leaf spring assembly of claim 1, wherein the adapter is vulcanized onto the dampers.

9. The transverse leaf spring assembly of claim 1, wherein the adapter has sidewall regions configured to conform geometrically to inner wall regions of the holder.

10. The transverse leaf spring assembly of claim 1, wherein the adapter has bearing surfaces configured to conform geometrically to contact surfaces of the dampers.

11. The transverse leaf spring assembly of claim 1, wherein the adapter is made of plastic.

12. The transverse leaf spring assembly of claim 1, wherein the adapter is made of polyamide or fiber-reinforced plastic.

13. The transverse leaf spring assembly of claim 1, wherein the dampers are made of elastomeric material.

14. The transverse leaf spring assembly of claim 1, wherein the dampers are made of rubber.

15. The transverse leaf spring assembly of claim 1, wherein the transverse leaf spring is made of glass-fiber reinforced plastic.

16. A kit for a motor vehicle, comprising:
   a plurality of transverse leaf springs, each configured for installation transversely to the motor vehicle via a bearing unit upon a vehicle body, each said transverse leaf spring having at least one length portion, with the length portions of the transverse leaf springs having different cross sectional geometries; and
   a plurality of adapters configured to conform to the transverse leaf spring in one-to-one correspondence for selective installation in a holder of the bearing unit between elastic dampers,
   wherein each of the adapters includes an upper adapter part and a lower adapter part directly connectable with one another and confining therebetween at least one of the transverse leaf spring in contact with the latter.

17. The kit of claim 16, wherein the adapters have a same outer configuration and define each an interior space configured to complement the cross sectional geometry of the pertaining one of the transverse leaf springs.

* * * * *